(12) United States Patent
Souma et al.

(10) Patent No.: US 7,466,500 B2
(45) Date of Patent: Dec. 16, 2008

(54) LENS UNIT AND IMAGE PICKUP APPARATUS

(75) Inventors: Yoshihito Souma, Sakai (JP); Yoshifumi Mitani, Sakai (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 6 days.

(21) Appl. No.: 11/824,688

(22) Filed: Jul. 2, 2007

(65) Prior Publication Data

US 2008/0007841 A1    Jan. 10, 2008

(30) Foreign Application Priority Data

Jul. 10, 2006    (JP)    .............................. 2006-189101

(51) Int. Cl.
*G02B 9/00*    (2006.01)
*G02B 15/14*    (2006.01)
*G02B 9/12*    (2006.01)
*G02B 9/14*    (2006.01)
*G02B 9/04*    (2006.01)

(52) U.S. Cl. ....................... 359/738; 359/740; 359/690; 359/691; 359/784; 359/785; 359/793

(58) Field of Classification Search ......... 359/738–740, 359/689–691, 784, 785, 793
See application file for complete search history.

(56) References Cited

U.S. PATENT DOCUMENTS

| | | | | |
|---|---|---|---|---|
| 6,072,637 A | * | 6/2000 | Okada et al. ................. | 359/676 |
| 6,870,691 B2 | | 3/2005 | Konno ......................... | 359/738 |
| 2005/0285970 A1 | | 12/2005 | Yamaguchi et al. ......... | 348/363 |

* cited by examiner

*Primary Examiner*—William C Choi
*Assistant Examiner*—Jack Dinh
(74) *Attorney, Agent, or Firm*—Sidley Austin LLP

(57) ABSTRACT

A lens unit according to the present invention is capable of varying power for forming an image onto an image pickup element. The lens unit includes: a plurality of lens groups, a diaphragm, and a shutter. In the plurality of lens groups, a distance between a k-th lens group counting from an object side and a (k+1)-th lens group arranged at an image side of the k-th lens group changes for varying power. The diaphragm is arranged between a position at an image side of the k-th lens group and a lens surface facing the object side of a lens closest to the image in the (k+1)-th lens group. The shutter is provided with an aperture in a noncircular shape and fulfills the predetermined conditional formulas.

15 Claims, 13 Drawing Sheets

LENS UNIT AND IMAGE PICKUP APPARATUS

This application is based on Japanese Patent Application No. 2006-189101 filed on Jul. 10, 2006, in Japanese Patent Office, the entire content of which is hereby incorporated by reference.

TECHNICAL FIELD

The present invention relates to a lens unit and an image pickup unit, particularly relates to a lens unit, which is capable of varying magnification for image pickup.

BACKGROUND

In recent years, miniaturization of a digital still camera and a video camera having an optical zoom capability has been promoted. Thus, miniaturization and thinner design of image pickup apparatuses to be installed into those apparatuses have been required. Demand for a compact image pickup apparatus, which is capable of being configured into a cellular phone and a portable information terminal, has increased. For this demand, a folded optical system and a retractable optical system have been proposed. From the viewpoint of shortening the time to start photographing, the folded optical system is superior to the retractable optical system. As a technology in which a relationship between a diaphragm and a shutter is defined in order to further miniaturize the folded optical system, US2002/0285970 has disclosed a system where a diaphragm and a shutter are arranged to be separate pieces and U.S. Pat. No. 6,870,691 has disclosed a method of not to move a shutter when varying an image-pickup magnification.

However, since the optical system disclosed in US2002/0285970 includes a shutter movably arranged between a negative first lens group and a positive second lens group, the shutter can be miniaturized. However, the distance between the first lens group and the second lens group needs to be secured at the telephoto end of the optical system. Thus it is hard to make the variable power ratio large while keeping the same total length.

Further, since the optical system described in U.S. Pat. No. 6,870,691 includes the shutter whose position is fixed, an axial light flux and an off-axial light flux at the position of the shutter change largely depending on the zooming position. Thus, when in a high-speed shutter operation, unevenness of luminance tends to occur. A shading correction needs to be conducted depending on the degree of the unevenness of luminance.

SUMMARY

Considering the above problems, the present invention is achieved to provide a small-sized and wide-angle lens unit, in which aberration is preferably corrected, and an image pickup apparatus including this lens unit.

A lens unit according to the present invention is capable of varying power for forming an image onto an image pickup element. The lens unit comprises: a plurality of lens groups in which a distance between a k-th lens group counting from an object side and a (k+1)-th lens group arranged at an image side of the k-th lens group changes for varying power; and a diaphragm. The diaphragm is arranged between a position at an image side of the k-th lens group and a lens surface facing the object side of a lens closest to the image in the (k+1)-th lens group. The lens unit further comprises a shutter with an aperture in a noncircular shape whose dimension along a direction of a minimum width of the aperture is $2H_s$. The shutter fulfills following conditional formulas, and is arranged on the image side and next to the (k+1)-th lens group.

$$H1 < H_s \tag{1}$$

$$0.1 < (H_{2H} + H_{2L})/H1 < 3.0 \tag{2}$$

Where, H1 is a height of a light flux from an optical axis at a position where the shutter is arranged, which is an outermost light flux out of a light flux forming an image on the optical axis when the diaphragm is full-opened, $H_{2H}$ is a height of a light flux from an optical axis at a position where the shutter is arranged, which is an outermost light flux out of a light flux forming an image at a maximum image height position when the diaphragm is full-opened, and $H_{2L}$ is a height of a light flux from an optical axis at a position where the shutter is arranged, which is an innermost light flux out of a light flux forming an image at a maximum image height position when the diaphragm is full-opened.

An image pickup apparatus according to the present invention comprises: an image pickup element; and a lens unit capable of varying power for forming an image onto the image pickup element. The lens unit comprises: a plurality of lens groups in which a distance between a k-th lens group counting from an object side and a (k+1)-th lens group arranged at an image side of the k-th lens group changes for varying power; and a diaphragm. The diaphragm is arranged between a position at an image side of the k-th lens group and a lens surface facing the object side of a lens closest to the image in the (k+1)-th lens group. The lens unit further comprises a shutter with an aperture in a noncircular shape whose dimension along a direction of a minimum width of the aperture is $2H_s$. The shutter fulfills following conditional formulas, and is arranged on the image side and next to the (k+1)-th lens group.

$$H1 < H_s \tag{1}$$

$$0.1 < (H_{2H} + H_{2L})/H1 < 3.0 \tag{2}$$

According to the present invention, there is provided a diaphragm arranged between a position from the k-th lens group to the (k+1)-th lens group counting from an object side, and a position on the object side of the lens located at the most image side in the (k+1)-th lens group. In other words, a diaphragm is arranged between a position at an image side of the k-th lens group and a lens surface facing the object side of a lens closest to the image in the (k+1)-th lens group. There is further provided, according to the present invention, a shutter arranged on the image side of the (k+1)-th lens group and next to the (k+1)-th lens group. The relation ship between the aperture shape of the shutter and heights of light fluxes at the position where the shutter is arranged is configured within a proper range. These allow to provide a small-sized and wide-angle lens unit in which aberrations are appropriately corrected.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

Figure 7A:
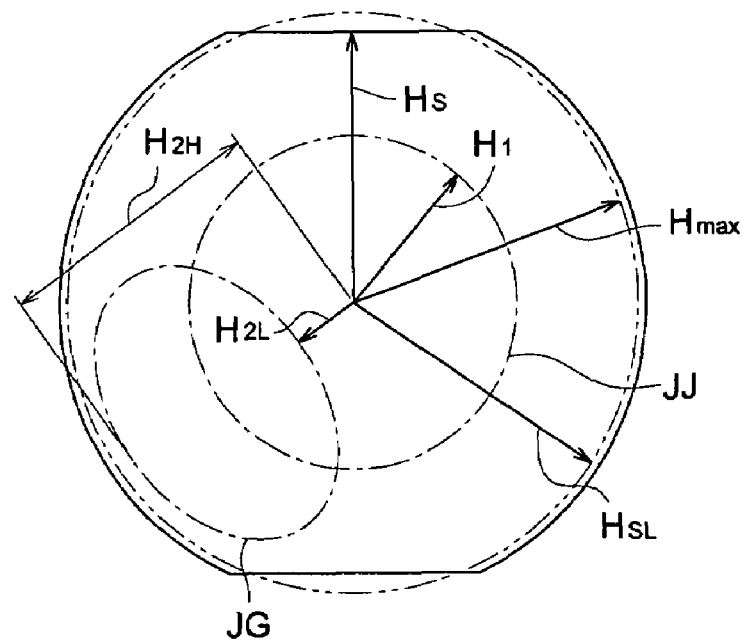
Figure 7B:
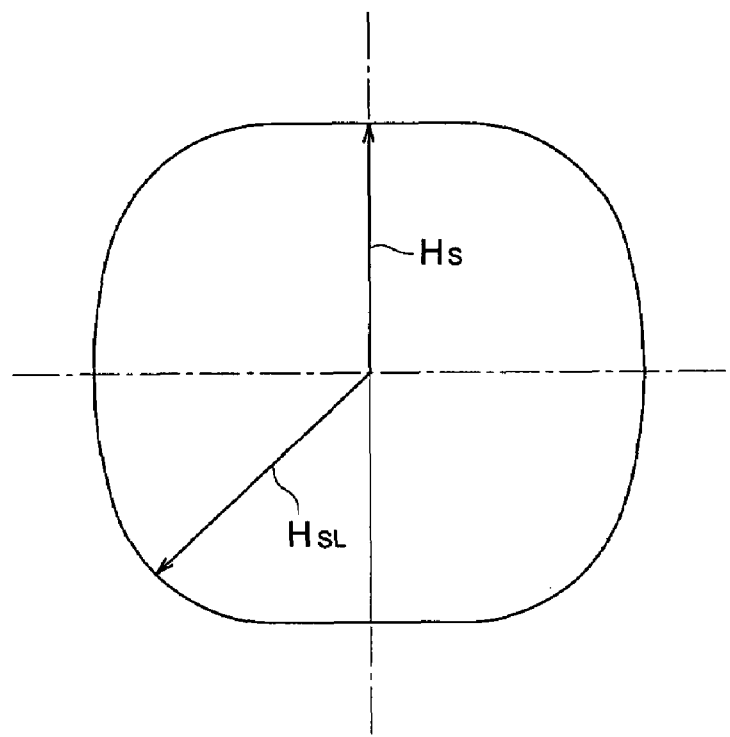
Figure 8:
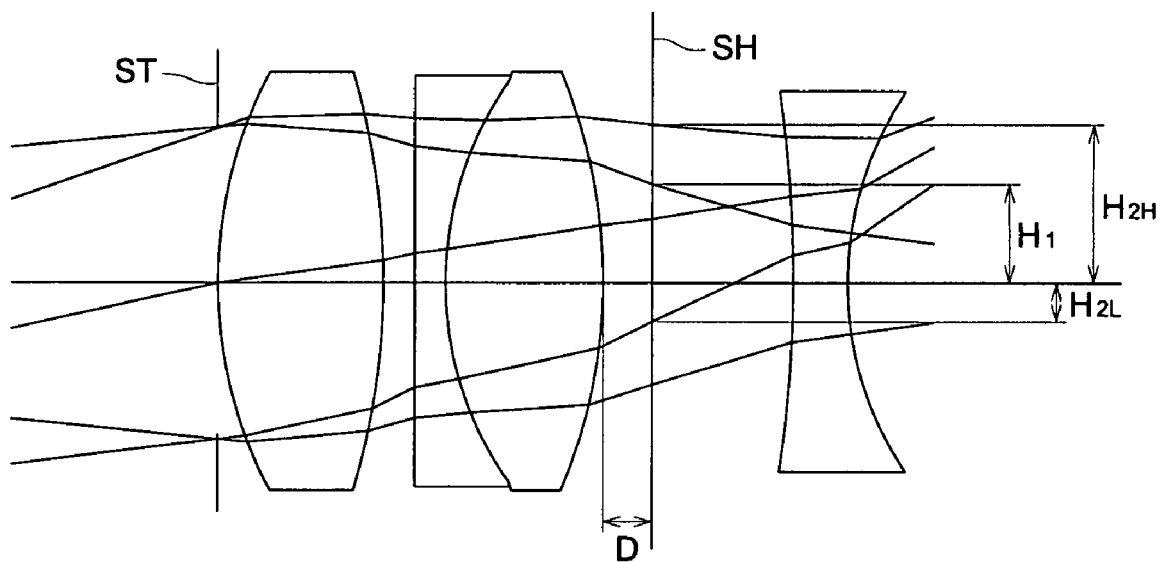
Figure 9:
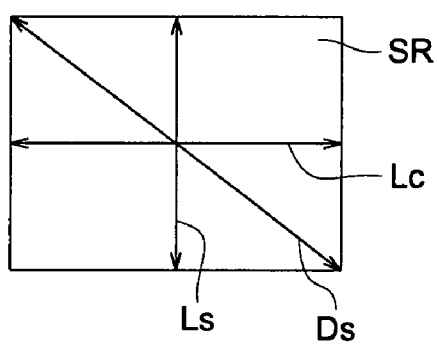
Figure 10:
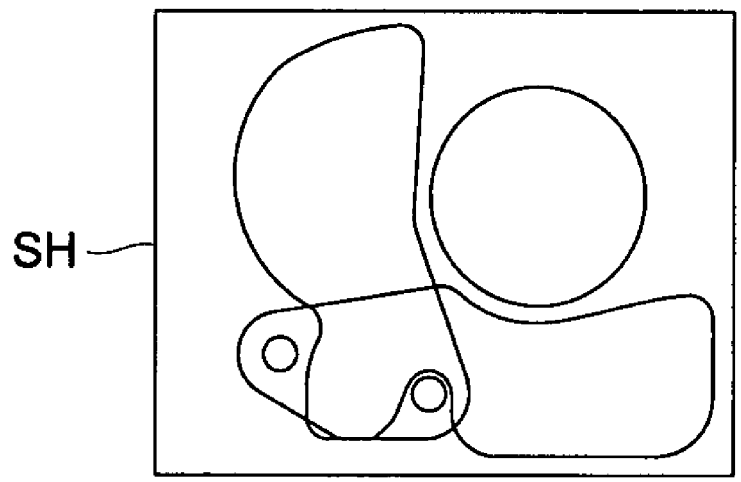
Figure 10:
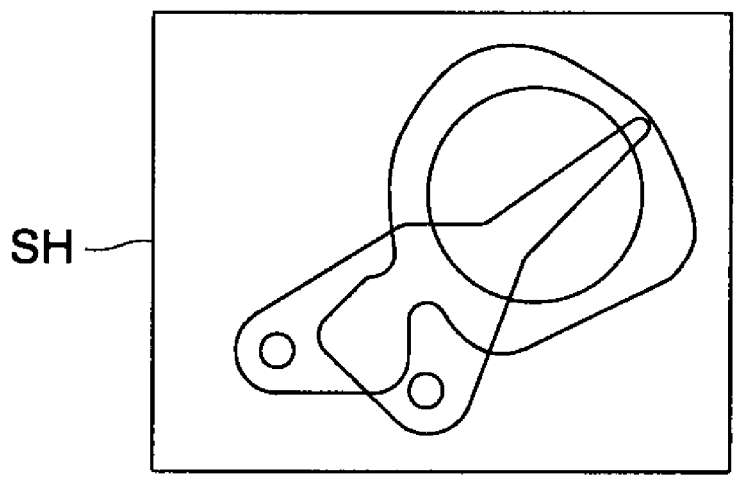
Figure 11A:
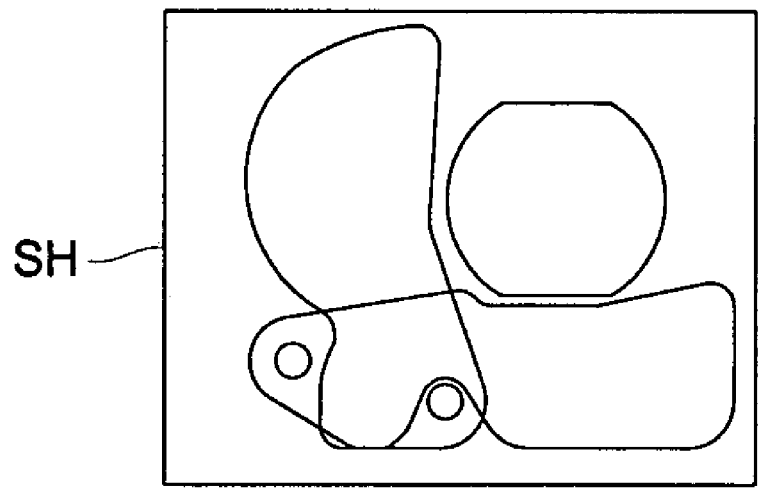
Figure 11B:
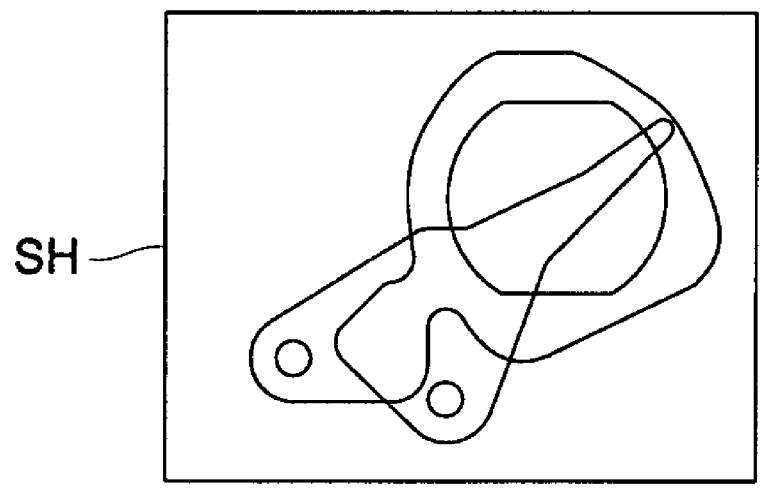
Figure 12:
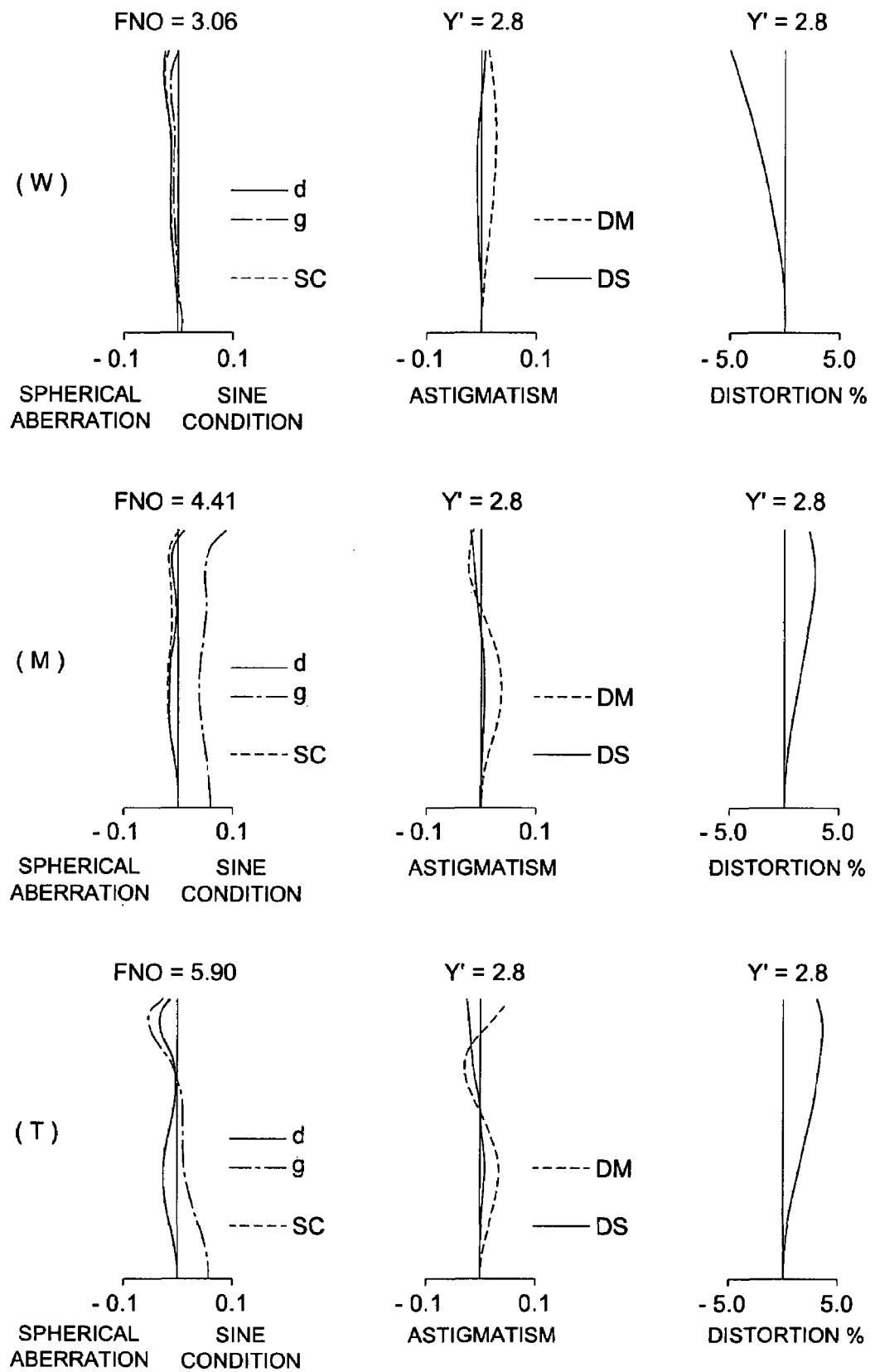
Figure 13:
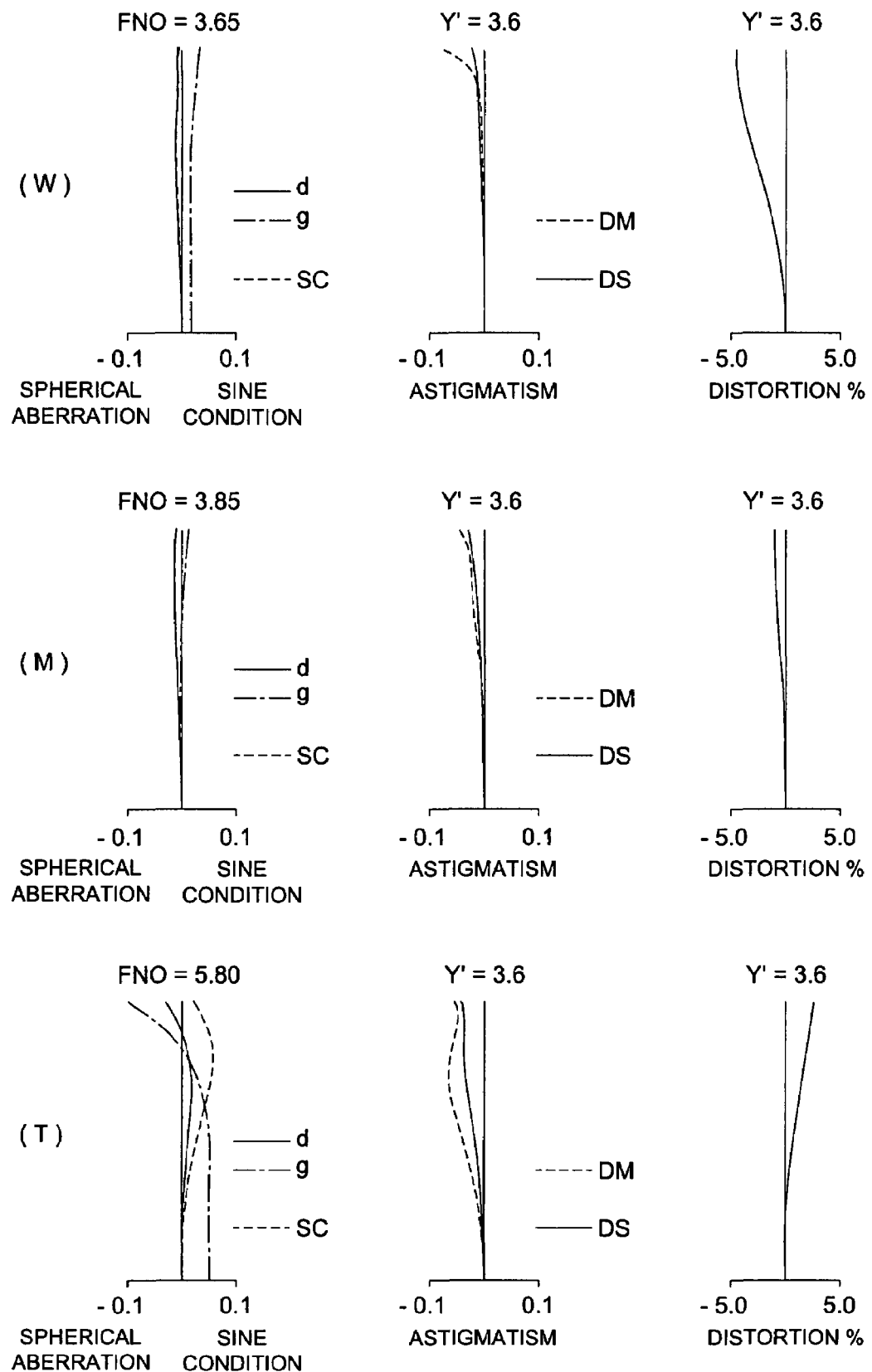
Figure 14:
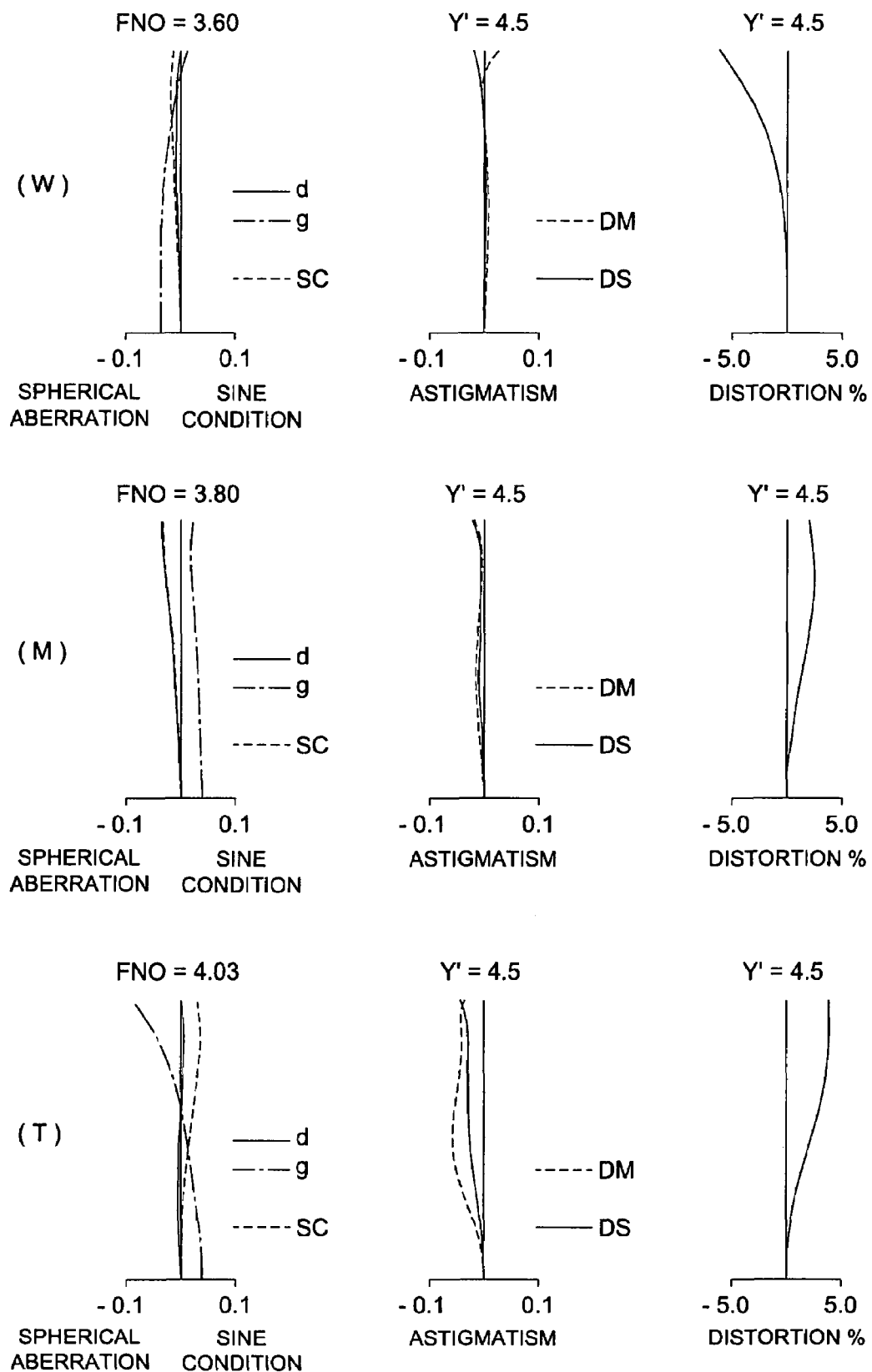

each of FIGS. 7(*a*) and 7(*b*) illustrates a schematic diagram showing an aperture shape of a shutter according to the present invention and heights of light fluxes at a shutter position;

FIG. 8 illustrates a schematic diagram showing a portion magnification drawing of a lens group including a shutter and a diaphragm according to the present invention and heights of light fluxes;

FIG. 9 illustrates a schematic diagram showing the shape of an image pickup element;

each of FIGS. 10(*a*) and 10(*b*) illustrates a schematic diagram of a conventional shutter apparatus;

each of FIGS. 11(*a*) and 11(*b*) illustrates a schematic diagram of a shutter apparatus according to the present invention;

FIG. 12 illustrates aberration diagrams of the first embodiment (Example 1);

FIG. 13 illustrates aberration diagrams of the second embodiment (Example 2); and FIG. 14 illustrates aberration diagrams of the third embodiment (Example 3).

DESCRIPTION OF THE PREFERRED EMBODIMENT

Embodiments of a lens unit and an image pickup apparatus according to the present invention will be described below with referring to drawings. An image pickup apparatus according to the present invention is an optical apparatus for optically taking an image of a subject into the optical apparatus and outputting it as an electric signal, which forms main configuration elements of a camera used for taking still images and movies of the subject. The examples of the camera are a digital camera, a video camera, a surveillance camera, an on-board camera, a camera for a TV-telephone, a camera for an intercom, a camera which is installed in or connected as an external camera to outside the followings: a personal computer, a mobile computer, a cellular phone, a PDA (Personal Digital Assistant), a peripheral apparatus (a mouse, a scanner and a printer) of these, and other digital equipment. It can be seen from these examples that the image pickup apparatus is utilized not only for configuring a camera, but also for adding a camera function to various apparatuses by installing the image pickup apparatus into the apparatuses. For example, it becomes possible to configure a digital device having a function for inputting image, such as a cellular phone having a camera.

Up to now, the word "Digital Camera" denotes an apparatus only for recording an optical still image. However, a digital still camera and a home use digital movie camera, which are capable of handling a still image and movie at the same time, have been proposed. Currently, they are not distinctive. Thus, the word "Digital Camera" includes all cameras having a image pickup apparatus including an image pickup optical system for forming an optical image and an image pickup element for converting an optical image to electric signals as main configuration elements, such as a digital still camera, a digital movie camera, and a Web camera. The Web camera includes both of a camera which is connected to an apparatus enabling image transmission and reception and which is directly connected to network, regardless of an open type or a private type, and a camera which is communicated to network through a apparatus having an information processing function such as a personal computer.

Figure 1:
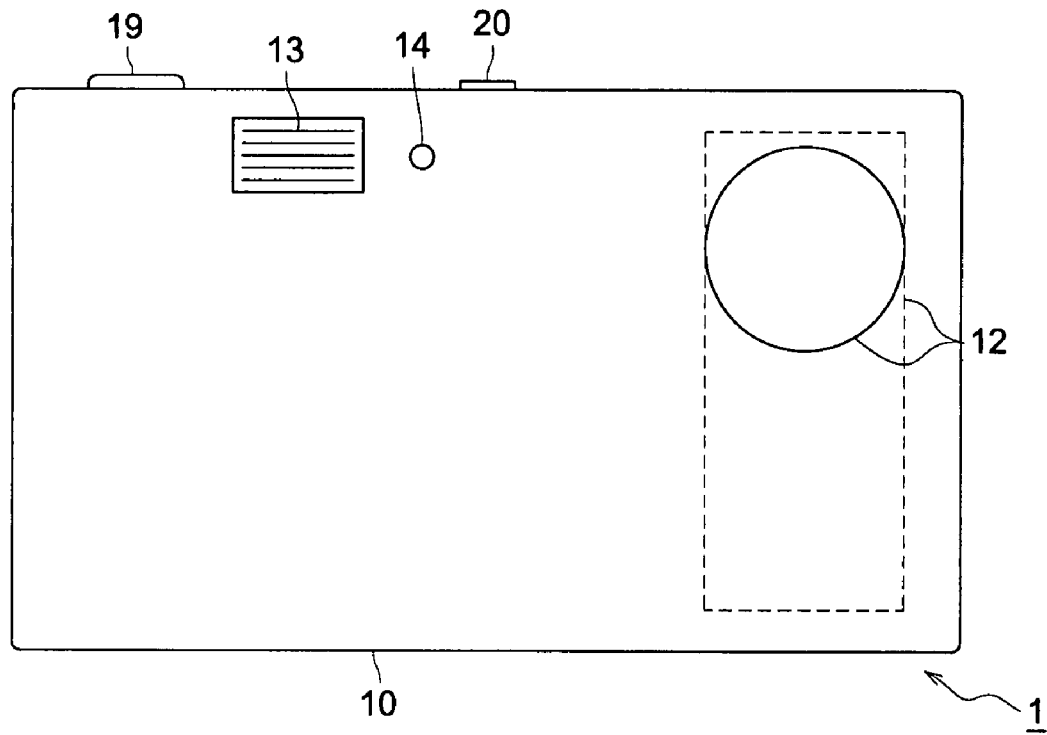
FIGS. 1(*a*) and 1(*b*) schematically illustrate a front view and a rear view of an outside appearance of a digital camera according to the present invention.
Figure 1:
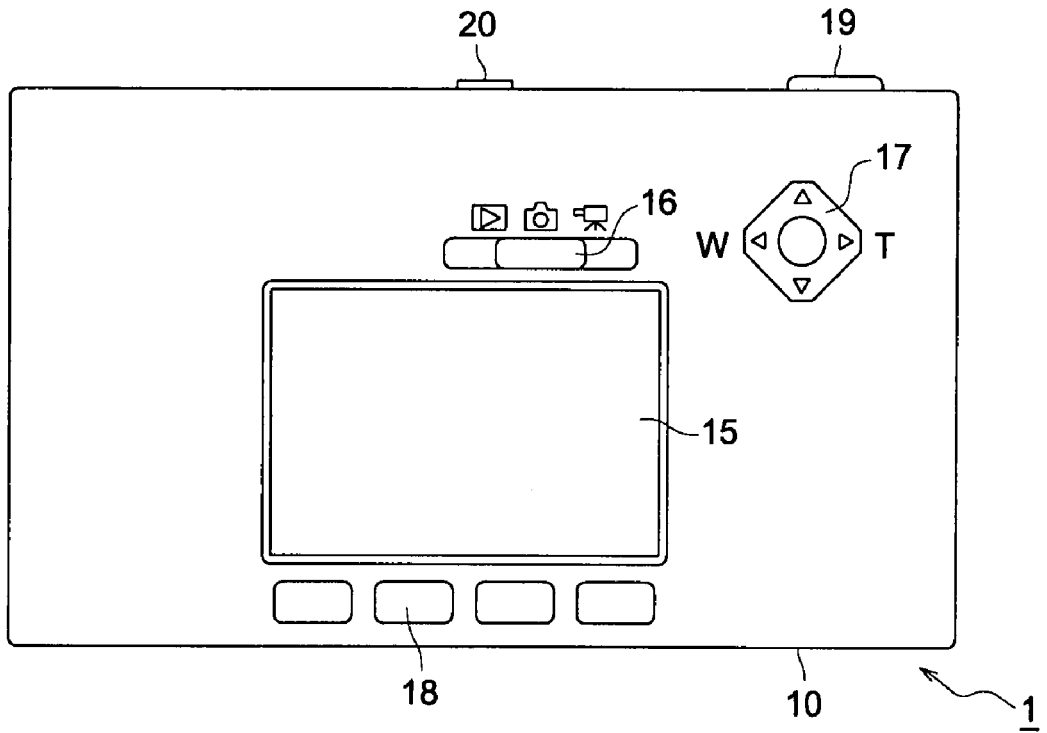

Each of FIGS. 1(*a*) and 1(*b*) schematically illustrates the outside appearance of a digital camera 1 according to the present invention. FIG. 1(*a*) illustrates a front view and FIG. 1(*b*) illustrates a rear view of the digital camera 1.

The digital camera 1 includes a lens unit 12, a flash emitting section 13 and a self-timer lump 14 on a front surface, a display section 15, a mode-setting switch 16, a cross key 17 and a plurality of operation keys 18 on a rear surface and a release button 19 and a power button 20 on the top surface.

A part of the lens unit 12 is arranged on the front surface of the body 10 and the rest of the lens section is arranged inside the body 10 as shown in dotted line in FIG. 1(*a*), in which the reflection optical member folds an optical axis substantially a right angle as described later. The flash emitting section 13 emits flashlight to irradiate a photographic object. The self-timer lump 14 indicates that self-timer photography is proceeding by turning on the self-timer lump 14.

A display section 15 is configured by a liquid crystal display for displaying a picked-up image and further displaying a setting status of the digital camera 1 and various kinds of information, such as an operation guide. A mode setting switch 16 is structured by a slide type switch and used for setting the operation mode of the digital camera 1. A cross key 17 has four contacts in left, right, up and down therein and is used for moving a cursor displayed on the display section 15. A lens unit 12 includes a zoom lens. The cross key is also used to adjust the focal length. An operation key 18 is used for setting the function of the digital camera 1, such as, switching the items displayed on the display section 15 and selecting the displayed items. A release button 19, which operates with a two-step action is used to instruct the preparation of picking-up the image to be recorded and to instruct the pick-up of the image to be recorded.

Figure 2:
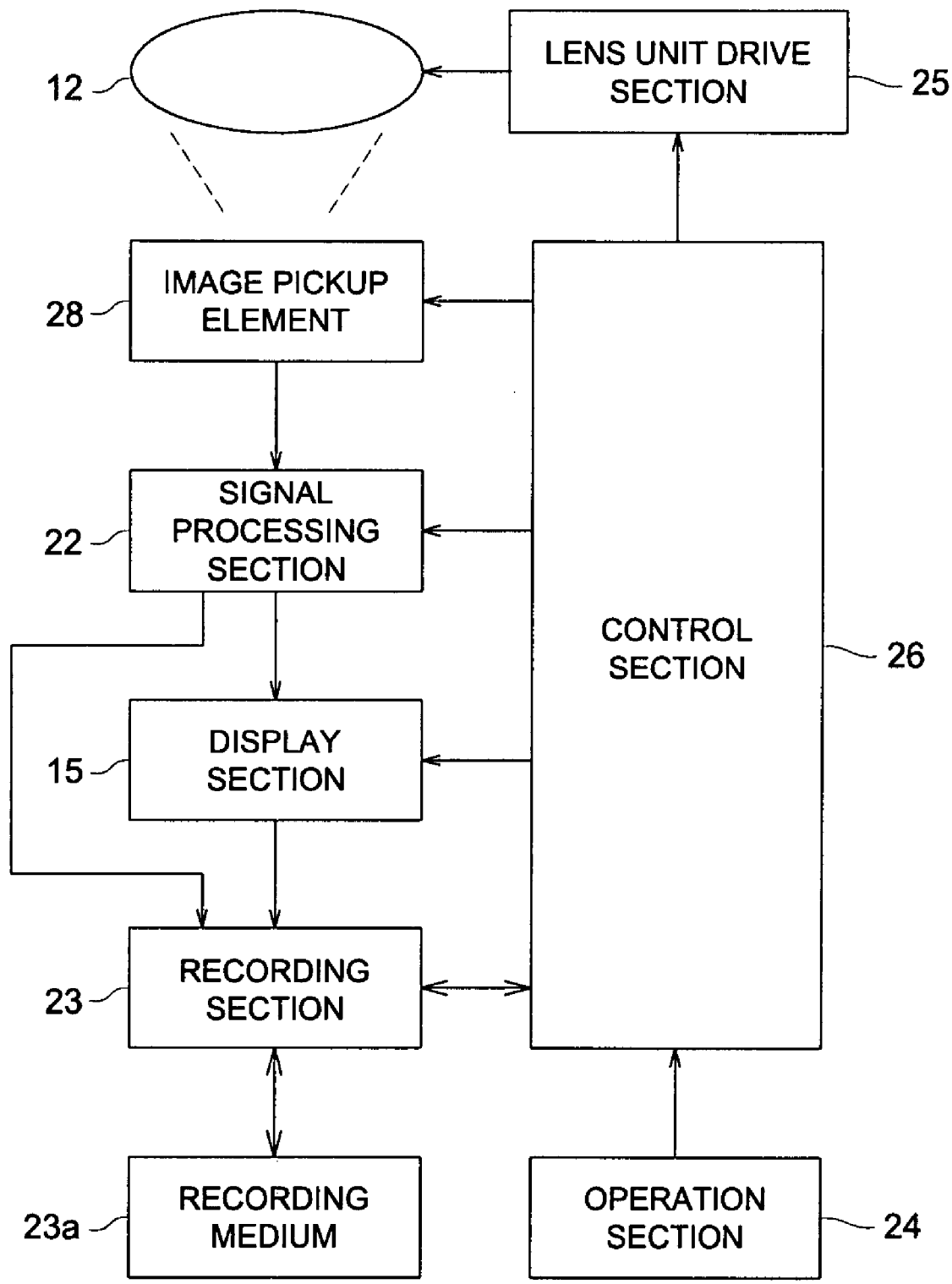
FIG. 2 illustrates a schematic diagram of a configuration of a digital camera according to the present invention.

FIG. 2 schematically illustrates the configuration of the digital camera 1. In addition to a lens unit 12 and the display section 15, the digital camera 1 includes an image pickup element 28, a signal processing section 22, a recording section 23, an operation section 24, a lens unit driving section 25 and a control section 26. The image pickup element 28 is an area sensor for outputting the signal of a received light amount of each pixel. The signal processing section 22 processes the output signal of the image pickup element 26 and generates image data representing the picked-up image. The recording section 23 records the image data generated by the signal processing section 22 onto a recording medium 23*a*, which is capable of being inserted and removed, and reads out the image data from the recording medium 23*a* to reproduce and display the image. The operation section 24 is a general name of a mode set switch 16, a cross key, an operation key 18, a release key 19 and a power button 20 to transfer the signals related to the operation of a user to the control section 26.

A lens unit 25 includes a motor and a transmission mechanism for transmitting the drive force to the lens groups in the lent unit 12 and sets the focal length and a focal position of the lens unit 12. The control section 26 controls respective sections in response to the direction given through the operation section 24.

Figure 3:
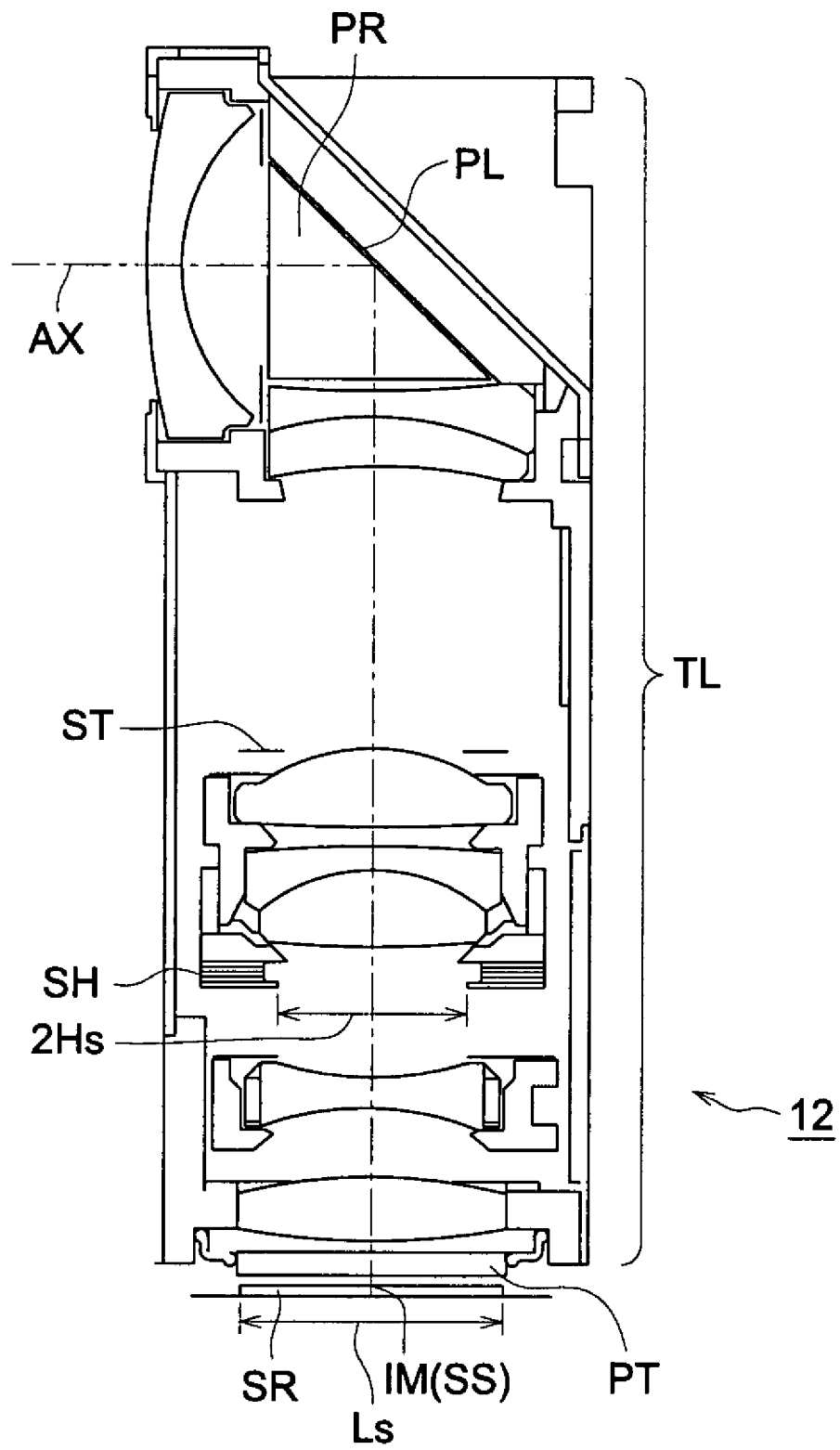
FIG. 3 illustrates a schematic diagram of a configuration of a lens unit in an image pickup apparatus according to the present invention.

FIG. 3 illustrates examples of the lens unit. The lens unit 12 shown in FIG. 3 is designed to be an optical configuration for folding an optical path by using a prism as a reflection optical member. However, the lens unit may be a type, which does not fold the optical path.

The lens unit 12 shown in FIG. 3 includes, in the order from an object (namely, a subject), a zoom lens system TL including a diaphragm ST and a shutter SH; a parallel flat plate PT; and an image pickup element SR. The zoom lens system TL is provided for forming an optical image IM of the object with a variable power. The parallel flat plate PT corresponds to optical filters such as an optical low pass filter, and an infrared cut-off filter; and to a cover glass of an image pickup element SR, which are arranged when necessary. The image pickup element SR is provided for converting an optical image IM formed by the zoom lens TL onto the light receiving surface SS into electric image signals.

In the lens unit 12, a flat reflection surface PL is arranged on the optical path within the zoom lens system TL. This reflection surface PL folds the optical path of the zoom lens system TL. At that time, a light flux is reflected so that the optical axis is folded at substantially 90 degrees.

The zoom lens system TL is structured by a plurality of lens groups. In the lens groups, at least one lens group moves along with the optical axis and changes at least one interval between lens groups to vary power (namely, to zoom).

With respect to the image pickup element SR, for example, solid-state image pickup elements having a plurality of pixels, such as a CCD (Charge Coupled Device) and a CMOS (Complementary Metal Oxide Semiconductor) sensor are used. And the optical image formed on the light receiving surface SS of the image pickup element by the zoom lens system TL is converted to electrical signals by the image pickup element SR. A predetermined digital image process and an image compression process are applied to the signals generated by the image pickup element SR when necessary. The signals are stored in the memory (for example, a semiconductor memory and an optical disc) or transferred to the other apparatus through a cable or after being converted to infrared signal, depending on the situation.

Figure 4:
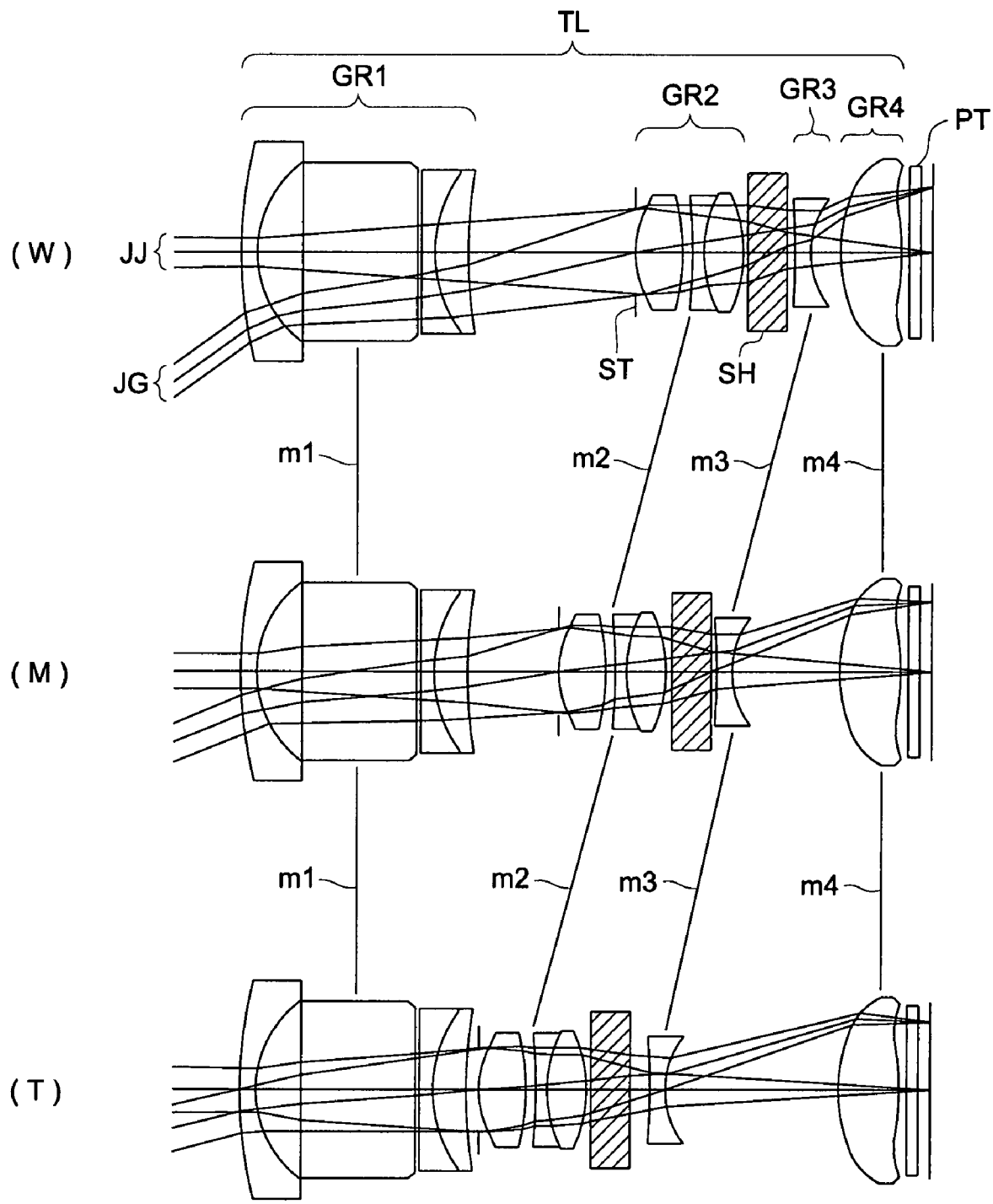
FIG. 4 illustrates a schematic diagram of a configuration of the first embodiment (Example 1)
Figure 5:
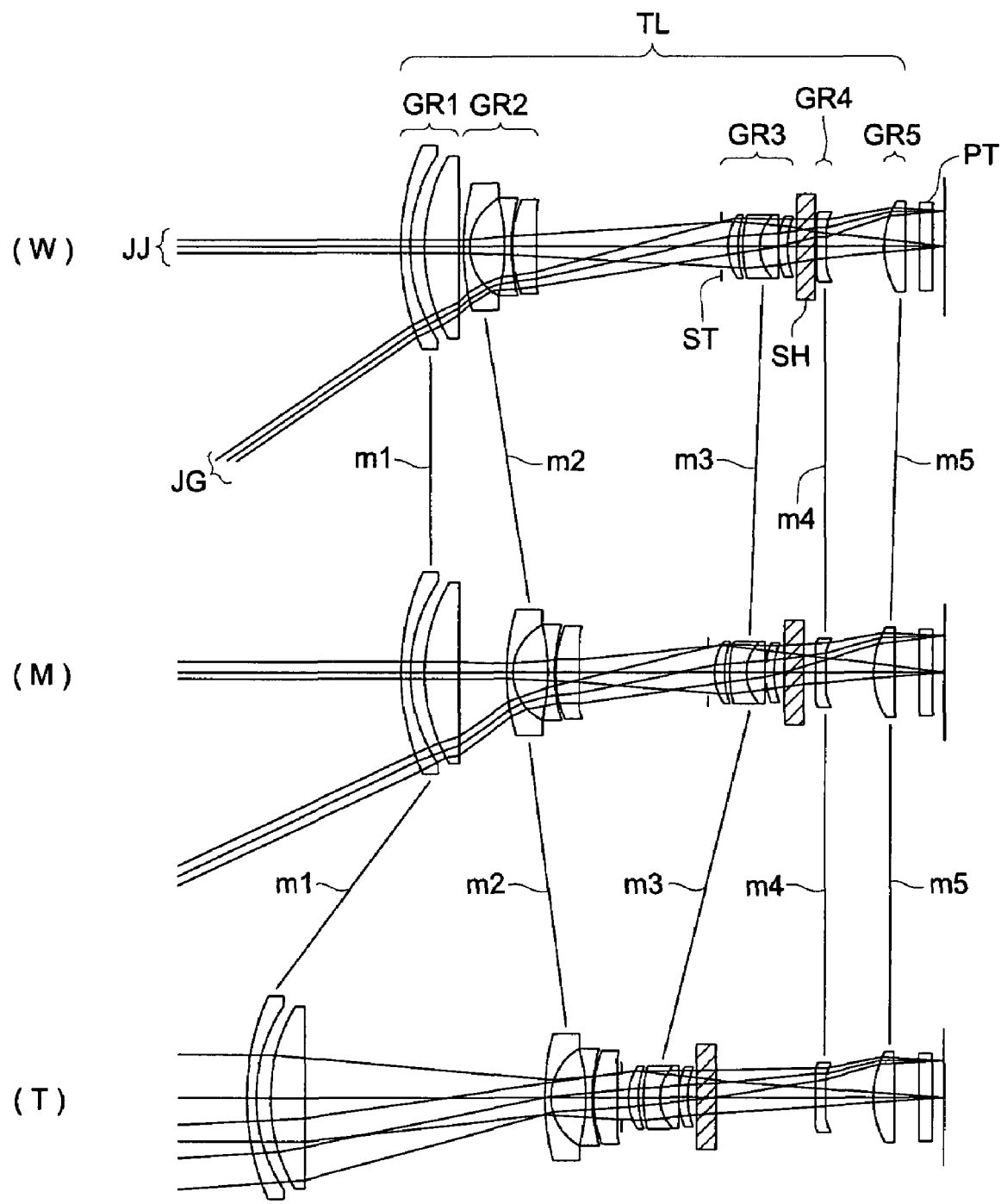
FIG. 5 illustrates a schematic diagram of a configuration of the second embodiment (Example 2)
Figure 6:
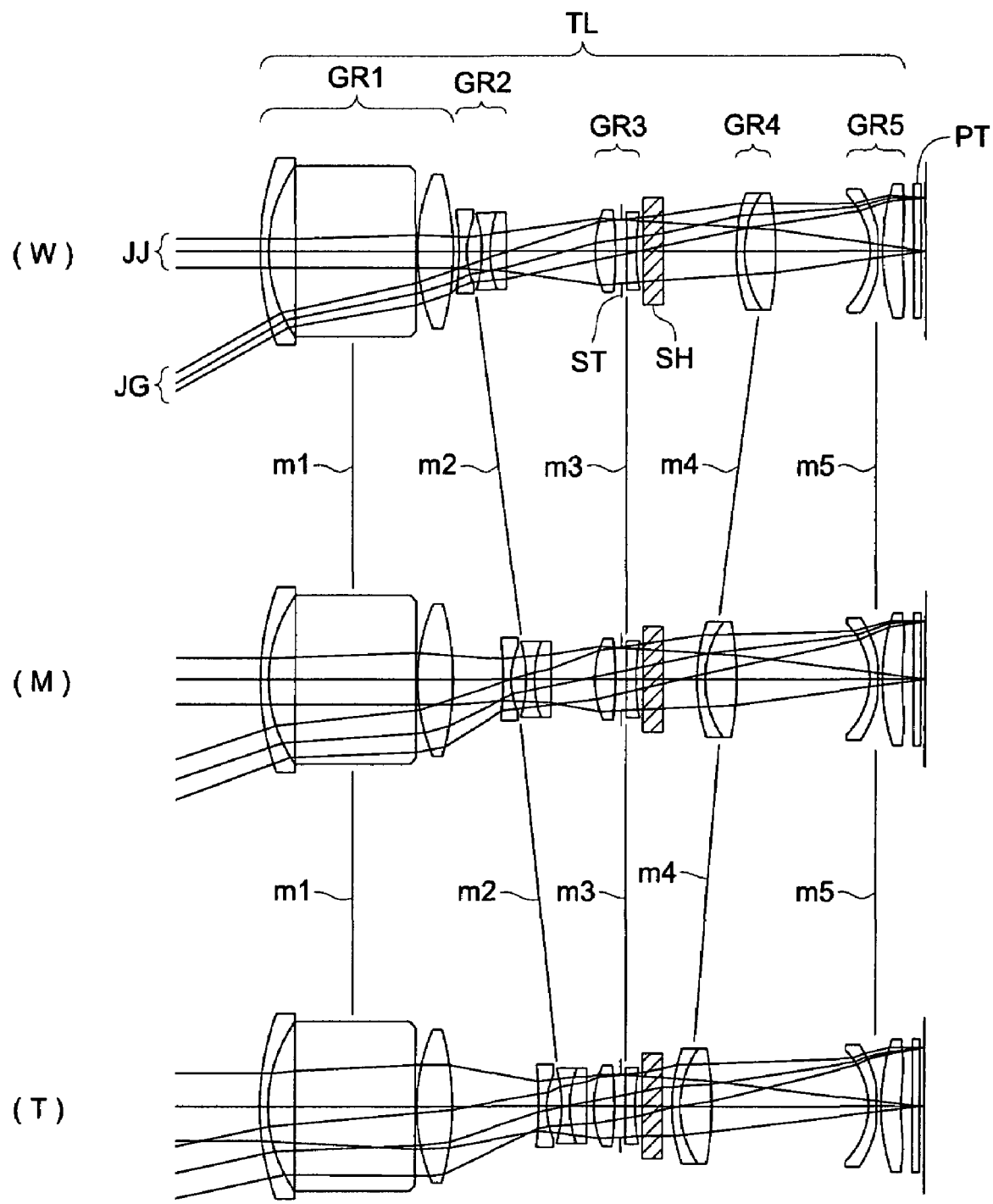
FIG. 6 illustrates a schematic diagram of a configuration of the third embodiment (Example 3)

FIGS. 4 to 6 illustrate optical configurations corresponding to the zoom lens systems TL structuring the first to third embodiments, and show respective lens arrangements and optical paths at a wide-angle end (W), a middle (M) and a telephoto end (T) as optical cross sectional views. The zoom lens systems shown in FIGS. 4 and 6 employ a folded optical system. Each of the optical cross sectional views in FIGS. 4 through 6 shows the lens system in a state that an optical path is unfolded. Lines m1 though m5 schematically illustrate moving locus respectively showing the movements of the first lens group GR1 through the fifth lens group GR5 on the zooming operations from the wide-angle end (W) to the middle (M), and from the middle to the telephoto end (T). In the second lens group of FIG. 4, diaphragm ST is arranged in the object side thereof, and a shutter SH is arranged in the image side thereof. The diaphragm ST, the second lens group and the shutter move as one body. In other words, the distance between the second lens group and the shutter is fixed. In the third lens group of FIG. 5, diaphragm ST is arranged in the object side thereof, and a shutter SH is arranged in the image side thereof. The diaphragm ST, the third lens group and the shutter move as one body. In other words, the distance between the third lens group and the shutter is fixed. In the third lens group of FIG. 6, diaphragm ST is arranged and a shutter SH is arranged in the image side thereof.

In the first embodiment, the first lens group GR1 has a negative power. The second lens group GR2 having a positive power is arranged in the image side of the first lens group GR1. The diaphragm ST is arranged between the first lens group GR1 and the second lens group GR2. The shutter SH is arranged in the image side of the second lens group GR2 and next to the second lens group GR2. In the second and third embodiments, the second lens group GR2 has a negative power and the third lens group having a positive power is arranged in the image side of the second lens group GR2. In the second embodiment, the diaphragm ST is arranged between the second lens group GR2 and the third lens group GR3. In the third embodiment, the diaphragm ST is arranged in the third lens group. The shutter SH is arranged in the image side of the third lens group GR3 and next to the third lens group GR3, in the second and third embodiments. Here, "power" denotes a quantity defined by a reciprocal number of a focal length.

The aperture shape of the shutter SH of the first through third embodiments will be described by using FIGS. 7(*a*), 7(*b*), 8, and 9. The examples of the aperture shape will be illustrated in FIGS. 7(*a*) and 7(*b*). In FIG. 7(*a*), H1 denotes a height of a light flux from an optical axis at a position where the shutter is arranged, which is an outermost light flux out of a light flux forming an image on the optical axis when the diaphragm is full-opened, at any zooming factor. $H_{2H}$ is a height of a light flux from an optical axis at a position where the shutter is arranged, which is an outermost light flux out of a light flux forming an image at a position where image height is maximum when the diaphragm is full-opened, at any zooming factor. $H_{2L}$ is a height of a light flux from an optical axis at a position where the shutter is arranged, which is an innermost light flux out of a light flux forming an image at a position where image height is maximum when the diaphragm is full-opened, at any zooming factor. FIG. 8 illustrates a portion magnification drawing showing the heights of light fluxes in the lens group including a diaphragm ST and a shutter SH. Further, FIG. 9 illustrates the shape of the image pickup area of the image pickup element SR, and the image pickup area has a length $L_s$ in a short side direction; a length $L_c$ in a long side direction; and a diagonal length $D_s$. The aperture of the shutter has a dimension $2H_s$ in a direction of a minimum width of the aperture, which is taken in substantially the same direction as the short side length $L_s$ of the image pickup element SR. The aperture of the shutter also has a dimension $2H_{SL}$ in a direction of a maximum width of the aperture, which is longer than the dimension $2H_s$ of the aperture in a direction of a minimum width of the aperture. The aperture shape of the shutter is a noncircular shape. Further it is preferable to satisfy the following conditional formulas (1) and (2).

$$H1 < H_s \tag{1}$$

$$0.1 < (H_{2H} + H_{2L})/H1 < 3.0 \tag{2}$$

In these conditional formulas, $H_{2H}$ has a positive value. $H_{2L}$ has a negative value when a light flux at the position where the shutter is arranged, which forms an image at the maximum image height position when the diaphragm is full-opened, has a cross section including the optical axis; or alternatively, $H_{2L}$ has a positive value when the light flux at the position where the shutter is arranged, which forms an image at the maximum image height position when the diaphragm is full-opened, has a cross section not including the optical axis.

According to the conventional configuration, when arranging a shutter between a lens group having a negative power and a lens group having a positive power, a certain distance between both lens groups was taken, from the viewpoint of the necessity for securing the distance between the lens groups on the optical axis for the arrangement of the shutter. Thus there was a problem that, due to the divergence effect of the lens group having a negative power, the effective diameter of the lens group having a positive power increased, and it was difficult to minimize the lens group. Further, under the condition that the total optical length is limited, when trying to secure the axial distance between the k-th lens group and (k+1) lens group, the moving range of the moving lens group is hardly secured. Thus, in order to attain the required zooming factor, it is necessary to increase the power of the moving lens group, which is not preferable from the viewpoint of aberration correction. As the countermeasure, it seams feasible to arrange the shutter in the lens group having a positive power. However, to secure the interval or distance between the lens groups becomes a limitation of an optical system design. Further, to secure the accuracy of an off-center of lenses becomes difficult.

For these problems, a shutter is arranged in the image side of the lens group having a positive power in each of the first through third embodiments, which enables to minimize the size of the variable power optical system while keeping the image forming capability. Further in the first through third embodiments, a diaphragm ST is arranged between a position from the lens group having a negative power to the lens group having a positive power, and a position on the object side of the lens arranged at most image side in the lens group having a positive power, in other words, the diaphragm is arranged between a position at an image side of the lens group having a negative power and a lens surface facing the object side of a lens closest to the image in the lens group having a positive power. Therefore, the distance between the diaphragm ST and the shutter ST is kept. Thus, the area where a light flux passes through at a position where the shutter is arranged becomes a noncircular shape. Thus the aperture shape of the shutter can be shaped in a noncircular shape. Each of FIGS. 10(*a*) and 10(*b*) illustrates a schematic diagram of a conventional shutter apparatus. Each of FIGS. 11(*a*) and 11(*b*) illustrates a schematic diagram of a shutter apparatus according to the present invention. By shaping the aperture shape into a non-circular shape as described above, the light shielding area of the shutter can be decreased, and the size of the shutter can be reduced. Further, by using this shutter, the miniaturization of the variable power optical system can be attained. Here, the shutter is not limited to a mechanical shutter. The shutter may be a liquid crystal type shutter. In FIG. 3, an aperture dimension $2H_s$ along a direction of a minimum width of the aperture of the shutter, and the short side dimension $L_s$ of the image pickup element are shown. However, the direction of the image pickup element is not limited to this.

By satisfying the conditional formula (2), the miniaturization of a shutter apparatus and a uniform luminance on the image surface can be attained. In the conditional formula (2), when $(H_{2H}+H_{2L})/H1$ becomes equal to or more than 0.1, the area where a light flux passes through at the shutter position is apart from a circular shape and the miniaturization effect increases. When $(H_{2H}+H_{2L})/H1$ becomes equal to or less than 3.0, the distance between an axial light flux and off-axial light decreases. Thus when an exposure time is short, unevenness of luminance on the image surface hardly occurs.

Further, it is more preferable to satisfy the conditional formula (2') instead of the conditional formula (2). By satisfying the conditional formula (2'), the miniaturization of a shutter apparatus and a uniform luminance on the image surface can be attained in further excellent condition.

$$0.3<(H_{2H}+H_{2L})/H1<2.0 \qquad (2')$$

It is further more preferable to satisfy the conditional formula (2") instead of the conditional formula (2). By satisfying the conditional formula (2"), the miniaturization of a shutter apparatus and a uniform luminance on the image surface can be attained in further more excellent condition.

$$0.4<(H_{2H}+H_{2L})/H1<1.9 \qquad (2'')$$

The half dimension $H_s$ of the shutter SH along a direction of a minimum width of the aperture preferably satisfies the conditional formula (3) below.

$$H1<H_s<H_{MAX} \qquad (3)$$

Where, $H_{MAX}$ is an axial height of an off-axis light flux at a position where the shutter is arranged, where the off-axis light flux is farthest from the optical axis in a total range of a varying power when the diaphragm is full-opened.

In the conditional formula (3), when $H_s$ becomes equal to or more than H1, since the axial light flux is not to be shielded by the aperture of the shutter, F-number becomes large, which is preferable. When $H_s$ becomes equal to or less than $H_{MAX}$, the aperture shape of the shutter is apart from a circular shape, which enhance the effect of the miniaturization of the shutter apparatus.

Further, as shown in the first and the third embodiments of the present invention, it is preferable that the lens group closest to the most object side includes a reflection optical element for folding the optical path of the lens unit. By arranging the optical element for folding the optical path at the most object side, it becomes possible to make a lens unit further thinner.

Further, it is preferable that the axial distance Dkm between a lens surface facing the image side of a lens closest to the image in the k-th lens group and an lens surface facing the object side of a lens closest to the object in the (k+1)-th lens group satisfies a conditional formula (4) below.

$$0.01<Dkm/Ds<0.50 \qquad (4)$$

Where Ds is a diagonal length of an image pickup area of the image pickup element.

In the conditional formula (4), when Dkm/Ds becomes equal to or more than 0.01, an axial distance between the k-th lens group and (k+1)-th lens group does not become excessively short, and the mechanical design of a mechanism for securing that the k-th lens group and (k+1)-th lens group do not hit, when varying power, does not become complicated. Further, when Dkm/Ds becomes equal to or less than 0.5, the effective diameter of the (k+1)-th lens group decreases due to the divergent effect of the k-th lens group. It enhances the effect of miniaturizing the lens unit.

EXAMPLE

A structure of a lens unit according to the present invention will be further concretely described by using construction data below. The examples 1 to 3 described below, are numerical examples, which corresponds to the first to third embodiments described above. The optical structures (FIGS. 4 to 6) showing the optical structures of the first to third embodiments show the corresponding lens configurations of the first to third examples. The shutter structure used in these examples is the one illustrated in FIGS. 7(*a*) and 7(*b*).

Tables 1 to 6 show construction data of the first to third examples and Table 7 shows the data corresponding to the parameters of the respective conditional formulas and related data of respective examples. Each of Tables 1, 3 and 5 shows the basic optical structure. In these tables, ri denotes a radius of curvature of the i-th surface counting from the object side, where i is a surface number and i=1, 2, 3, . . . ; di (i=1, 2, 3, . . . ) denotes an axial surface distance (unit: mm) between i-th surface and (i+1)-th surface counting from the object side; and Ni (i=1, 2, 3, . . . ) and vi (i=1, 2, 3, . . . ) denote respectively a refraction index (Nd) and Abbe number (vd) for the d-line of the optical material positioned in the axial surface distance di. The axial surface distance di which changes in a zooming operation, denotes a variable air distance at a wide-angle end (the shortest focal length state, W), a middle (a middle focal length state, M) and a telephoto end (the longest focal length state, T). Focal lengths of the total system (unit: mm) and F-numbers each corresponding to respective focal length stats (W), (M) and (T) are represented by f and FNO in the Tables.

The surface corresponding to a radius of curvature ri followed by an asterisk ("*") is an aspherical surface which includes a refractive optical surface shaped in an aspherical surface and a surface having a refractive action equivalent to the aspherical surface. These surfaces are defined by the following formula (AS) for expressing the surface shape of an aspherical surface. Each of Tables 2, 4 and 6 will show aspherical surface data of respective examples. Where, the coefficient of the term, which does not appear, is 0 (zero). With respect to the all data, E-n represents "x $10^{-n}$".

$$X(H) = (C0 \cdot H^2) / (1 + \sqrt{(1 - \varepsilon \times C0^2 \cdot H^2)}) + \sum (Ai \cdot Hj) \quad \text{(AS)}$$

Where in formula (AS), X(H) denotes a displacement of the aspherical surface in an optical axis AX direction at a height H (whose origin is the surface vertex); H denotes a height vertical to the optical axis AX; C0 denotes a paraxial curvature (=1/ri), $\varepsilon$ denotes the quadric surface parameter; and Aj denotes a j-th order aspherical coefficient.

FIGS. 12 to 14 show aberration diagrams corresponding to the first to third embodiments. Each of FIGS. 12 to 14 includes various aberrations at states where the focus is adjusted to the infinite at a wide-angle end (W), a middle (M), and a telephoto end (T). The various aberrations are, from the left to right in each figure, spherical aberration, astigmatism and distortion aberration. Where, FNO denotes a F number; and Y' (mm) denotes a maximum image height (corresponding to the distance from the optical axis) on the light receiving surface SS of the image pickup element SR. In the spherical aberration diagrams, a solid line d denotes a spherical aberration amount (mm) against d-line and a broken line SC denotes an amount of an offence against a sine condition (mm). In the astigmatism diagrams, a broken line DM denotes astigmatisms (mm) against the d-line on a meridional surface, and a solid line DS denotes astigmatisms (mm) against the d-line on a sagittal surface. Further, in the distortion diagram, a solid line denotes a distortion (%) against the d-line.

TABLE 1

| | Focal Length State | W | M | T |
|---|---|---|---|---|
| Example 1 | f(mm) | 3.992 | 6.906 | 11.577 |
| | FNO | 3.059 | 4.413 | 5.900 |
| | 2ω | 73.826 | 43.955 | 26.848 |

| Radius of Curvature ri (mm) | Effective Diameter (mm) | Axial Surface Distance di (mm) | Refractive Index Ni | Abbe Number vi |
|---|---|---|---|---|
| r1 = 18.499 | 4.17 | d1 = 0.700 | N1 = 1.90366 | v1 = 31.31 |
| r2 = 4.729 | 3.37 | d2 = 1.990 | | |
| r3 = ∞ | 3.31 | d3 = 5.000 | N3 = 1.90366 | v3 = 31.31 |
| r4 = ∞ | 3.01 | d4 = 0.100 | | |
| r5 = ∞ | 3.00 | d5 = 0.600 | N5 = 1.59270 | v5 = 35.45 |
| r6 = 5.840 | 2.91 | d6 = 1.411 | N6 = 1.92286 | v6 = 20.88 |
| r7 = 16.574 | 2.77 | d7 = 7.350-4.038-0.660 | | |
| r8 = 1 | | d8 = 0.010 | | |
| r9* = 4.261 | 1.96 | d9 = 2.048 | N9 = 1.58913 | v9 = 61.24 |
| r10* = −8.577 | 1.99 | d10 = 0.446 | | |
| r11 = −18.214 | 1.93 | d11 = 0.400 | N11 = 1.90366 | v11 = 31.31 |
| r12 = 5.367 | 1.93 | d12 = 1.750 | N12 = 1.58913 | v12 = 61.24 |
| r13* = −4.833 | 2.01 | d13 = 2.253-2.216-2.803 | | |
| r14* = 40.395 | 1.83 | d14 = 0.700 | N14 = 1.76802 | v14 = 49.23 |
| r15* = 3.502 | 1.82 | d15 = 1.316-4.664-7.455 | | |
| r16* = 9.002 | 3.49 | d16 = 2.626 | N16 = 1.53048 | v16 = 55.72 |
| r17* = −6.874 | 3.21 | d17 = 0.300 | | |
| r18 = ∞ | 3.14 | d18 = 0.500 | N18 = 1.51680 | v18 = 64.20 |
| r19 = ∞ | 3.08 | d19 = 0.000 | | |

TABLE 2

Example 1 i-th Aspherical Surface Coefficient

| i-th Surface | ε | A4 | A6 | A8 | A10 |
|---|---|---|---|---|---|
| 9th Surface | 1.000 | −9.0890E−04 | −1.5816E−04 | 3.5241E−05 | −8.3259E−06 |
| 10th Surface | 1.000 | 3.2297E−03 | −2.0140E−04 | −1.7171E−05 | −4.0870E−06 |
| 13th Surface | 1.000 | 1.6565E−03 | 2.2420E−04 | 1.0181E−05 | 2.4174E−06 |
| 14th Surface | 1.000 | −7.1155E−03 | 2.2330E−03 | −4.1584E−04 | 3.9720E−05 |
| 15th Surface | 1.000 | −1.0306E−02 | 2.5727E−03 | −5.0836E−04 | 5.4079E−05 |
| 16th Surface | 1.000 | −9.0646E−04 | 5.9648E−04 | −4.2197E−05 | 1.3507E−06 |
| 17th Surface | 1.000 | 4.5113E−03 | 1.7426E−04 | 1.0513E−05 | −1.2133E−06 |

TABLE 3

| | Focal Length State | W | M | T |
|---|---|---|---|---|
| Example 2 | f(mm) | 5.400 | 7.744 | 54.000 |
| | FNO | 3.651 | 3.851 | 5.800 |
| | 2ω | 69.878 | 50.327 | 7.437 |

| Radius of Curvature ri (mm) | Effective Diameter (mm) | Axial Surface Distance di (mm) | Refractive Index Ni | Abbe Number νi |
|---|---|---|---|---|
| r1 = 26.219 | 10.10 | d1 = 0.900 | N1 = 1.84666 | ν1 = 23.78 |
| r2 = 17.412 | 9.37 | d2 = 1.511 | | |
| r3 = 18.494 | 9.04 | d3 = 3.604 | N3 = 1.72916 | ν3 = 54.66 |
| r4 = 258.771 | 8.80 | d4 = 0.700–4.477–25.854 | | |
| r5 = 25.954 | 6.16 | d5 = 0.700 | N5 = 1.88300 | ν5 = 40.80 |
| r6 = 6.012 | 4.71 | d6 = 3.643 | | |
| r7 = −24.256 | 4.46 | d7 = 0.700 | N7 = 1.72916 | ν7 = 54.66 |
| r8 = 16.774 | 4.36 | d8 = 0.100 | | |
| r9 = 11.373 | 4.39 | d9 = 2.503 | N9 = 1.92286 | ν9 = 20.88 |
| r10 = 42.275 | 4.20 | d10 = 19.712–13.560–0.605 | | |
| r11 = ∞ | | d11 = 0.800 | | |
| r12 = 6.315 | 2.83 | d12 = 0.904 | N12 = 1.62004 | ν12 = 36.30 |
| r13 = 8.900 | 2.79 | d13 = 0.536 | | |
| r14 = 9.605 | 2.86 | d14 = 1.728 | N14 = 1.76182 | ν14 = 26.61 |
| r15 = 4.473 | 2.71 | d15 = 1.967 | N15 = 1.62041 | ν15 = 60.35 |
| r16 = −781.447 | 2.71 | d16 = 0.100 | | |
| r17* = 7.758 | 2.70 | d17 = 1.000 | N17 = 1.53048 | ν17 = 55.72 |
| r18* = 8.384 | 2.63 | d18 = 2.967–4.381–13.328 | | |
| r19 = 20.878 | 3.06 | d19 = 1.000 | N19 = 1.60700 | ν19 = 27.59 |
| r20* = 8.300 | 3.02 | d20 = 6.321–5.265–6.029 | | |
| r21 = 8.726 | 4.26 | d21 = 2.212 | N21 = 1.53048 | ν21 = 55.72 |
| r22* = 112.746 | 4.17 | d22 = 1.585–2.641–1.877 | | |
| r23 = ∞ | 3.99 | d23 = 1.500 | N23 = 1.51680 | ν23 = 64.20 |
| r24 = ∞ | 3.90 | d24 = 0.000 | | |

TABLE 4

Example 2 i-th Aspherical Surface Coefficient

| i-th Surface | ε | A4 | A6 | A8 | A10 |
|---|---|---|---|---|---|
| 17th Surface | 1.000 | −3.1561E−04 | −6.3812E−05 | −1.4077E−06 | −1.0147E−07 |
| 18th Surface | 1.000 | 6.8805E−04 | −4.9542E−05 | −1.8700E−06 | −2.6538E−08 |
| 20th Surface | 1.000 | 3.0587E−05 | −8.4193E−07 | −6.6491E−07 | 3.4771E−08 |
| 22th Surface | 1.000 | 6.7828E−05 | −9.7233E−06 | 7.0639E−07 | −1.7273E−08 |

TABLE 5

| | Focal Length State | W | M | T |
|---|---|---|---|---|
| Example 3 | f(mm) | 7.850 | 13.253 | 22.372 |
| | FNO | 3.600 | 3.805 | 4.030 |
| | 2ω | 62.763 | 36.816 | 21.958 |

| Radius of Curvature ri (mm) | Effective Diameter (mm) | Axial Surface Distance di (mm) | Refractive Index Ni | Abbe Number νi |
|---|---|---|---|---|
| r1 = 21.923 | 7.17 | d1 = 0.700 | N1 = 1.92286 | ν1 = 20.88 |
| r2 = 11.934 | 6.47 | d2 = 2.325 | | |

TABLE 5-continued

| | | | | |
|---|---|---|---|---|
| r3 = ∞ | 6.42 | d3 = 9.900 | N3 = 1.90366 | ν3 = 31.31 |
| r4 = ∞ | 5.91 | d4 = 0.100 | | |
| r5 = 14.925 | 5.78 | d5 = 2.840 | N5 = 1.74100 | ν5 = 52.59 |
| r6* = −29.381 | 5.50 | d6 = 0.637-4.428-7.582 | | |
| r7 = −31.769 | 2.87 | d7 = 0.600 | N7 = 1.88300 | ν7 = 40.80 |
| r8 = 7.215 | 2.50 | d8 = 1.272 | | |
| r9 = −13.544 | 2.50 | d9 = 0.600 | N9 = 1.56732 | ν9 = 42.85 |
| r10 = 7.864 | 2.62 | d10 = 1.39 | N10 = 1.92286 | ν10 = 20.88 |
| r11 = 70.660 | 2.64 | d11 = 7.445-3.654-0.500 | | |
| r12 = 7.930 | 2.81 | d12 = 1.760 | N12 = 1.58913 | ν12 = 61.24 |
| r13 = −20.720 | 2.70 | d13 = 0.400 | | |
| r14 = ∞ | | d14 = 0.400 | | |
| r15 = ∞ | 2.59 | d15 = 0.850 | N15 = 1.81359 | ν15 = 26.08 |
| r16* = 28.435 | 2.64 | d16 = 7.978-4.943-3.051 | | |
| r17 = 13.651 | 4.27 | d17 = 0.700 | N17 = 1.92286 | ν17 = 20.88 |
| r18 = 7.747 | 4.19 | d18 = 2.610 | N18 = 1.62299 | ν18 = 58.11 |
| r19 = −30.002 | 4.24 | d19 = 7.964-10.999-12.890 | | |
| r20 = −6.384 | 4.14 | d20 = 0.700 | N20 = 1.92286 | ν20 = 20.88 |
| r21 = −9.088 | 4.51 | d21 = 0.300 | | |
| r22* = 18.877 | 4.95 | d22 = 1.630 | N22 = 1.60700 | ν22 = 27.59 |
| r23* = 63.373 | 4.95 | d23 = 0.800 | | |
| r24 = ∞ | 4.88 | d24 = 0.600 | N24 = 1.51680 | ν24 = 64.20 |
| r25 = ∞ | 4.85 | d25 = 0.000 | | |

TABLE 6

Example 3 i-th Aspherical Surface Coefficient

| i-th Surface | ε | A4 | A6 | A8 | A10 |
|---|---|---|---|---|---|
| 6th Surface | 1.000 | 4.3657E−05 | 4.0120E−07 | −1.7660E−08 | 2.1785E−10 |
| 16th Surface | 1.000 | 4.9021E−04 | 9.4603E−06 | −2.1189E−07 | 3.0003E−08 |
| 22th Surface | 1.000 | 3.3545E−04 | −3.3721E−05 | 1.1628E−06 | −1.1364E−08 |
| 23th Surface | 1.000 | 1.0015E−03 | −8.5376E−05 | 1.3824E−06 | — |

TABLE 7

| | Example 1 | | Example 2 | | Example 3 | |
|---|---|---|---|---|---|---|
| | Wide-Angle End | Telephoto End | Wide-Angle End | Telephoto End | Wide-Angle End | Telephoto End |
| $H_1$ | 1.195 | 1.345 | 1.784 | 2.081 | 2.362 | 2.424 |
| $H_{2H}$ | 1.919 | 1.741 | 2.636 | 2.618 | 2.724 | 2.756 |
| $H_{2L}$ | −0.423 | −0.927 | 0.562 | −0.496 | 0.171 | −0.713 |
| $H_S$ | 1.600 | 1.600 | 2.400 | 2.400 | 2.650 | 2.650 |
| $(H_{2H} + H_{2L})/H_1$ | 1.252 | 0.605 | 1.793 | 1.020 | 1.226 | 0.843 |
| D | 0.5 | 0.5 | 0.8 | 0.8 | 0.8 | 0.8 |
| $D_{km}/D_S$ | 0.12 | | 0.08 | | 0.06 | |

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A lens unit capable of varying power for forming an image onto an image pickup element, the lens unit comprising:

a plurality of lens groups in which a distance between a k-th lens group counting from an object side and a (k+1)-th lens group arranged at an image side of the k-th lens group changes for varying power;

a diaphragm arranged between a position at an image side of the k-th lens group and a lens surface facing the object side of a lens closest to the image in the (k+1)-th lens group; and a shutter with an aperture in a noncircular shape whose dimension along a direction of a minimum width of the aperture is $2H_s$, the shutter fulfilling following conditional formulas, the shutter being arranged on the image side and next to the (k+1)-th lens group:

$$H1 < H_s, \text{ and}$$

$$0.1 < (H_{2H} + H_{2L})/H1 < 3.0,$$

where H1 is a height of a light flux from an optical axis at a position where the shutter is arranged, the light flux being an outermost light flux out of a light flux forming an image on the optical axis when the diaphragm is full-opened, $H_{2H}$ is a height of a light flux from an optical axis at a position where the shutter is arranged, the light flux being an outermost light flux out of a light flux forming an image at a maximum image height position when the diaphragm is full-opened, and $H_{2L}$ is a height of a light flux from an optical axis at a position where the shutter is arranged, the light flux being an innermost light flux out of a light flux forming an image at a maximum image height position when the diaphragm is full-opened.

2. The lens unit of claim 1,
wherein the shutter fulfills a following conditional formula:

$$0.3 < (H_{2H} + H_{2L})/H1 < 2.0.$$

3. The lens unit of claim 1,
wherein the shutter fulfills a following conditional formula:

$$0.4 < (H_{2H} + H_{2L})/H1 < 1.9.$$

4. The lens unit of claim 1,
wherein the k-th lens group has a negative power and the (k+1)-th lens group has a positive power.

5. The lens unit of claim 4,
wherein a distance between the shutter and the (k+1)-th lens group is fixed.

6. The lens unit of claim 4, fulfilling a following conditional formula:

$$H1 < H_s < H_{MAX},$$

where $H_{MAX}$ is an axial height of an off-axial light flux at a position where the shutter is arranged, the off-axis light flux being farthest from the optical axis in a total range of a varying power when the diaphragm is full-opened.

7. The lens unit of claim 1,
wherein a distance between the shutter and the (k+1)-th lens group is fixed.

8. The lens unit of claim 1, fulfilling a following conditional formula:

$$H1 < H_s < H_{MAX},$$

where $H_{MAX}$ is an axial height of an off-axial light flux at a position where the shutter is arranged, the off-axis light flux being farthest from the optical axis in a total range of a varying power when the diaphragm is full-opened.

9. The lens unit of claim 1,
wherein a lens group closest to the object side among the plurality of lens groups comprises a reflection optical member for bending an optical path thereof.

10. The lens unit of claim 1,
wherein the plurality of lens groups comprise in order from the object side:
a first lens group with a negative power; and
a second lens group with a positive power,
the first lens group is the k-th lens group, and
the shutter moves with the second lens group as one body for varying power.

11. The lens unit of claim 10, fulfilling a following conditional formula:

$$H1 < H_s < H_{MAX},$$

where $H_{MAX}$ is an axial height of an off-axial light flux at a position where the shutter is arranged, the off-axial light flux being farthest from the optical axis in a total range of a varying power when the diaphragm is full-opened.

12. The lens unit of claim 1,
wherein the plurality of lens groups comprise in order from the object side:
a first lens group with a positive power;
a second lens group with a negative power; and
a third lens group with a positive power,
the second lens group is the k-th lens group.

13. The lens unit of claim 12, fulfilling a following conditional formula:

$$H1 < H_s < H_{MAX},$$

where $H_{MAX}$ is an axial height of an off-axial light flux at a position where the shutter is arranged, the off-axial light flux being farthest from the optical axis in a total range of a varying power when the diaphragm is full-opened.

14. The lens unit of claim 1,
wherein the k-th lens group and the (k+1)-th lens group fulfills a following conditional formula:

$$0.01 < Dkm/Ds < 0.50,$$

where Dkm is an axial distance between a lens surface facing the image side of a lens closest to the image in the k-th lens group and an lens surface facing the object side of a lens closest to the object in the (k+1)-th lens group, and Ds is a diagonal length of an image pickup area of the image pickup element.

15. An image pickup apparatus comprising:
an image pickup element; and
a lens unit capable of varying power for forming an image onto the image pickup element, the lens unit comprising:
a plurality of lens groups in which a distance between a k-th lens group counting from an object side and a (k+1)-th lens group arranged at an image side of the k-th lens group changes for varying power;
a diaphragm arranged between a position at an image side of the k-th lens group and a lens surface facing the object side of a lens closest to the image in the (k+1)-th lens group; and
a shutter with an aperture in a noncircular shape whose dimension along a direction of a minimum width of the aperture is $2H_s$, the shutter fulfilling following conditional formulas, the shutter being arranged on the image side and next to the (k+1)-th lens group:

$$H1 < H_s, \text{ and}$$

$$0.1 < (H_{2H} + H_{2L})/H1 < 3.0,$$

where H1 is a height of a light flux from an optical axis at a position where the shutter is arranged, the light flux being an outermost light flux out of a light flux forming an image on the optical axis when the diaphragm is full-opened, $H_{2H}$ is a height of a light flux from an optical axis at a position where the shutter is arranged, the light flux being an outermost light flux out of a light flux forming an image at a maximum image height position when the diaphragm is full-opened, and $H_{2L}$ is a height of a light flux from an optical axis at a position where the shutter is arranged, the light flux being an innermost light flux out of a light flux forming an image at a maximum image height position when the diaphragm is full-opened.

* * * * *